J. D. Jones,
Sieve.

No. 80,966.  Patented Aug. 11, 1868.

Witnesses:
Wm A Morgan
G. C. Cotton.

Inventor:
Mrs. J. D. Jones
per Murray
Attorney

United States Patent Office.

MRS. J. D. JONES, OF JERSEY CITY, NEW JERSEY.

Letters Patent No. 80,966, dated August 11, 1868.

IMPROVED SIEVE.

The Schedule referred to in these Letters Patent and making part of the same.

TO ALL WHOM IT MAY CONCERN:

Be it known that I, Mrs. J. D. Jones, of Jersey City, in the county of Hudson, and State of New Jersey, have invented a new and useful Improvement in Sieves; and I do hereby declare that the following is a full, clear, and exact description thereof, which will enable others skilled in the art to make and use the same, reference being had to the accompanying drawings forming part of this specification, in which—

Similar letters of reference indicate like parts.

My invention has for its object to furnish an improved sieve, designed to take the place of the cullenders, sieves, and coarse cloths that are now used for screening and straining pumpkins, apples, &c., and materials for catsups, jellies, &c., which shall be simple in construction and effective and convenient in use.

It consists in the construction and combination of the various parts, as hereinafter more fully described.

A is a pan or dish, made with vertical sides, or with the upper parts of its sides vertical, and which may be of any desired or convenient size.

The pan A should be provided with handles $a^1$, and with a spout, $a^2$, for convenience in pouring out the strained material, and with ears, $a^3$, for securing it to a table or other support when desired.

Figure 2:
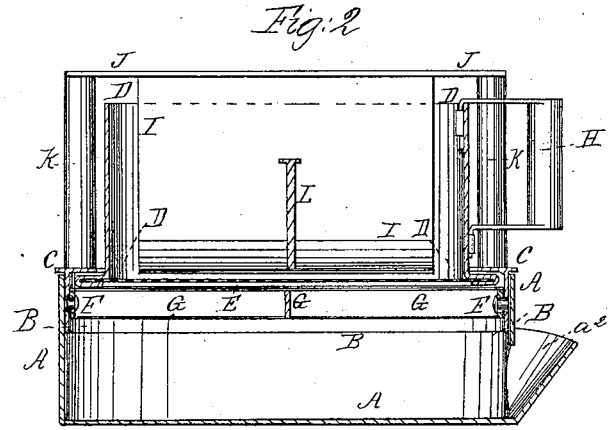
Figure 2 is a vertical cross-section of the same, taken through the line $x\ x$, fig. 1.

B is a band or hoop, fitting loosely into the mouth of the pan or dish A, and to the upper edge of which is attached an annular plate, C, of such a size as to project both upon the outer and inner sides of said hoop B, as shown in fig. 2, the outer part or flange of said plate resting upon the upper edge of the pan or dish A.

D is a cylindrical vessel, of such a size as to fit into the interior of the annular plate C, and which has an outwardly-projecting flange formed upon its lower end, underlapping the inwardly-projecting part or flange of the annular or ring-plate C.

The flange of the vessel D is turned back upon itself to form a groove to receive the edge of the wire cloth E.

If desired, this groove may be formed by attaching a ring-plate to the under side of the flange of the said vessel D.

F is a hoop, fitting into the interior of the hoop B, upon the upper edge of which rests the flange of the vessel D, and which is detachably secured to the said hoop B by pins, screws, bolts, or other convenient detachable means.

G are bars passing across and attached to the hoop F, below the wire cloth E. The bars G serve a double purpose: they support the middle part of the wire cloth when in use, and prevent its sagging and bagging, and also serve to clean off the lower side of the said wire cloth, so that it may not be necessary to remove the vessel D for that purpose.

H is a handle attached to the vessel D, for convenience in operating it, and which is removably attached to said vessel, so that it may be easily detached when it is desired to remove the said vessel D from its place.

Figure 1:
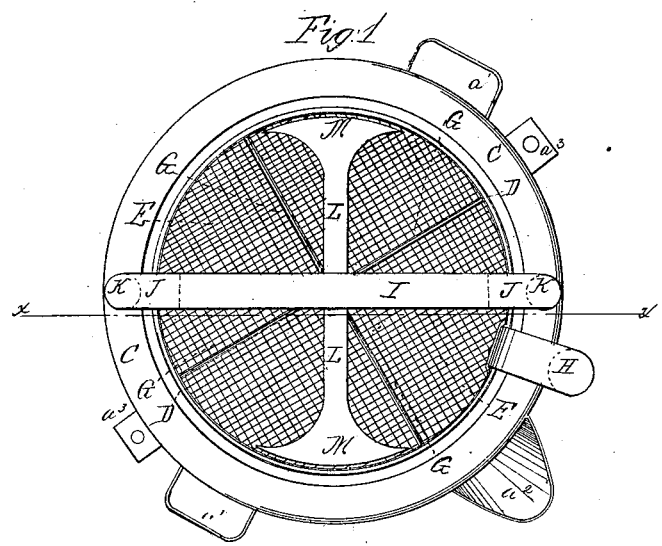
Figure 1 is a top or plan view of my improved sieve.

I is a presser, which is attached to and suspended from the bar J, the ends of which are attached to the upper ends of the short post K, the lower ends of which are secured to the annular plate C, upon opposite sides of the vessel D, as shown in figs. 1 and 2.

The presser I is made of such a depth that its lower edge, which is rounded off as shown in fig. 2, may be a little above the wire cloth E, as shown in fig. 2.

To the opposite sides of the presser I, are attached the inner ends of the arms L, which have cross-heads M attached to their outer ends, said cross-heads M being made convex upon their outer sides to correspond with the curve of the vessel D, and concave upon their inner sides, as shown in fig. 1, so that as the vessel D is moved back and forth, the cross-head scrapers M may prevent the formation of currents, at the same time moving the material slightly inward, and stopping it in such a position that the presser I may act upon it to force it into closer contact with the wire cloth E, and thus hasten the operation.

This device is designed for bringing the material into proper position and pressing it down upon the wire cloth, so that it may be no longer necessary to wait for the material to be screened or strained to become so cold that the hands of the operator can be put into it, as is now necessary, thus enabling the substance to be strained or screened while very hot, which is a great advantage.

In the case of factories where jellies, jams, catsups, &c., are prepared and put up for market, the machine may be made large, and may be driven by power applied by any of the well-known means for such purposes.

Having thus described my invention, I claim as new, and desire to secure by Letters Patent—

1. The dish or pan A, or equivalent vessel, hoop B, annular plate C, flanged cylindrical vessel D, wire cloth E, and detachable hoop F, having cross-bars G, attached to it, in combination with each other, said parts being constructed and arranged substantially as herein shown and described, and for the purpose set forth.

2. The presser and scrapers I J K L M, constructed substantially as herein shown and described, in combination with the devices A B C D E F G, as and for the purposes set forth.

MRS. J. D. JONES.

Witnesses:
JAS. VAN BENSCHOTEN,
ISAAC WAKEFIELD.